March 6, 1956 Y. D. HENDERSON Re. 24,126
HYDRAULIC TRACK ADJUSTER
Original Filed Oct. 15, 1951
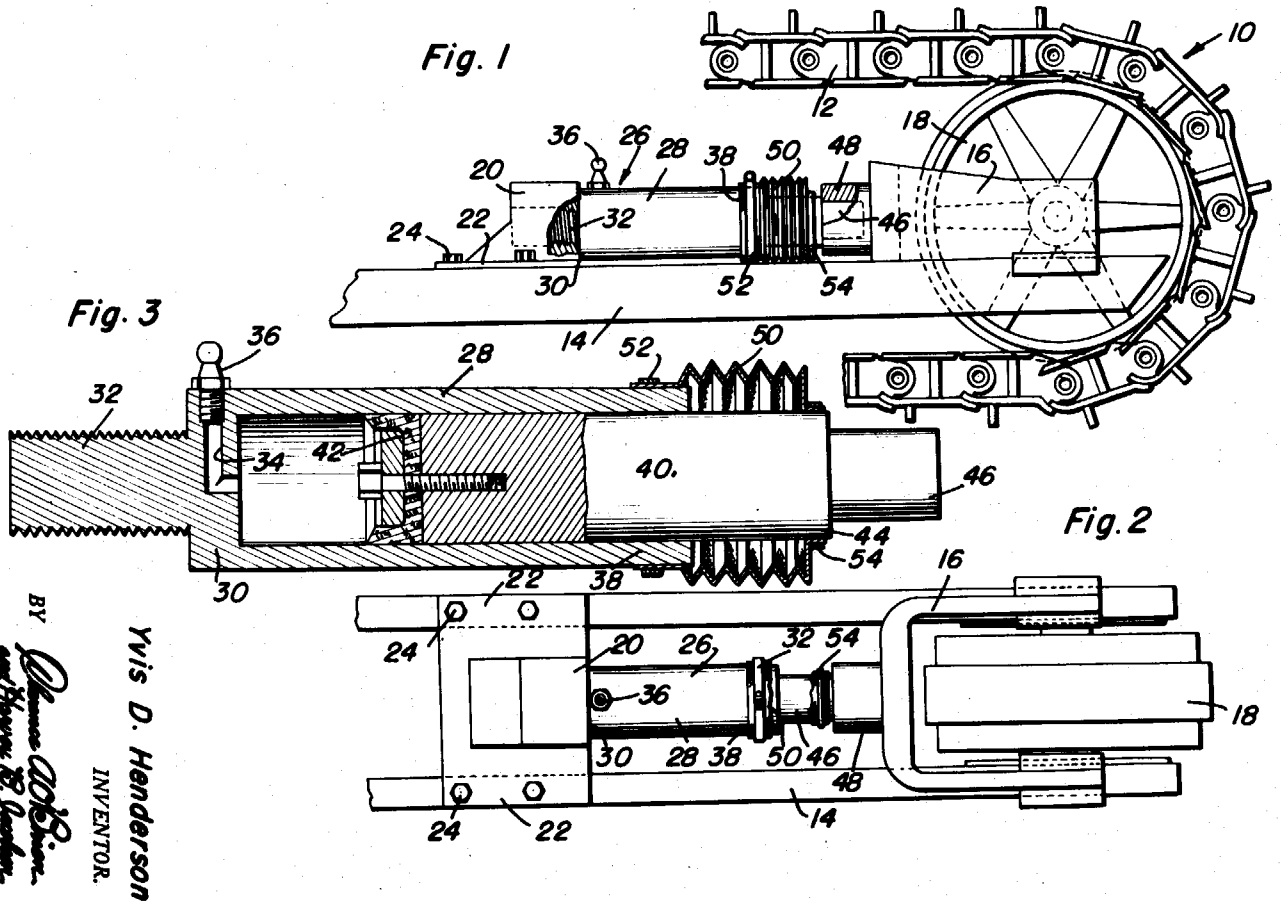
Yvis D. Henderson
INVENTOR.
BY Clarence A. O'Brien and Harvey B. Jacobson
Attorneys United States Patent Office Re. 24,126
Reissued Mar. 6, 1956

24,126

HYDRAULIC TRACK ADJUSTER

Yvis D. Henderson, Pittsburg, Tex.

Original No. 2,697,641, dated December 21, 1954, Serial No. 251,338, October 15, 1951. Application for reissue May 17, 1955, Serial No. 509,131

3 Claims. (Cl. 305—9)

Matter enclosed in heavy brackets [ ] appears in the original patent but forms no part of this reissue specification; matter printed in italics indicates the additions made by reissue.

This invention relates to new and useful improvements in track adjusters for crawler type vehicles and the primary object of the present invention is to provide a hydraulic adjuster for the endless tracks of crawler type vehicles.

Another important object of the present invention is to provide a hydraulic track adjuster including a hydraulic cylinder having a slidable plunger operatively connected to the idler of a crawler vehicle and a grease fitting whereby the plunger may be moved outwardly from the cylinder as grease is admitted into the cylinder through the fitting, *said grease fitting retaining the grease in said cylinder to fixedly hold the plunger in such outwardly adjusted position to maintain tension on the track of the vehicle.*

A further object of the present invention is to provide a hydraulic track adjuster that is quickly and readily applied to or removed from the idler guide rail of a crawler vehicle in a convenient manner and which involves a novel expansible dust shield forming a connection between the plunger and the casing therefor.

A still further aim of the present invention is to provide a hydraulic track adjuster of the aforementioned character that is simple and practical in construction, strong and reliable in use, inexpensive to manufacture, service and install, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of an endless track structure for a crawler type vehicle and showing the invention operatively connected therewith;

Figure 2 is a plan view of Figure 1; and,

Figure 3 is a longitudinal vertical sectional view of the present hydraulic adjuster.

Referring now to the drawings in detail, wherein for the purpose of illustration, there is disclosed a preferred embodiment of the present invention, the numeral 10 represents an endless track structure for a crawler type vehicle including the usual endless track 12, horizontal guide rail 14, guide 16 slidably received on the rail 14 and an idler sprocket 18 rotatably supported by the guide 16.

The present invention does not attempt to claim the above well known structure but is merely used in conjunction therewith to permit longitudinal adjustment of the guide 16, on the rail 14 to remove slack from the track 12 *by holding the guide in its adjusted position.*

An internally threaded sleeve 20 is formed with attaching flanges 22 that are flat to rest against the upper face of rail 14. The flanges 22 are formed with apertures that register with internally threaded openings in the rail 14 and which receive fasteners 24 that removably secure the sleeve or socket member 20 to the rail 14.

A hydraulic cylinder 26 is supported on the rail 14 and includes a cylindrical casing 28 whose closed end 30 is formed with a reduced externally threaded extension 32 that is receivably engaged in the sleeve 20. The closed end 30 is also formed with a passage 14 that extends into the interior of casing 28 from the outer periphery thereof. The outer threaded end of passage 34 receivably engages a grease fitting 36, whereby a lubricant may be admitted into the casing.

The open end 38 of casing 28 slidably receives a plunger 40 whose inner end removably supports a piston head or flexible washer 42 having sealing contact with the inner periphery of the casing. The outer end 44 of plunger 40 is provided with a reduced extension 46 that will enter a socket 48 in the guide 16.

A bellows-like sleeve 50 embraces the outer end of plunger 40. One end of the bellows-like sleeve 50 is clamped about the end 38 of cylindrical casing 28 by a clamp 52 whereas the other end of the bellows-like sleeve is clamped about the end 44 of plunger 40 by a clamp 54.

In practical use of the present invention, a suitable grease is forced into the casing 28 behind the washer 42 through fitting 36 and the piston rod or plunger 40 will be moved outwardly from the cylinder, thereby urging the sprocket 18 against the track *to an adjusted position, the grease being confined or retained in the cylinder by the fitting to positively hold the plunger in such adjusted position.* Obviously, other specific types of cylinders 26 may be employed.

The sleeve 50 will expand as the plunger is extended from the end 38 of casing 28 in order to cover and shield the portion of the plunger extended from the casing and prevent the accumulation of foreign matter in the cylinder.

*The foregoing description of the invention is explanatory only, and changes in the details of the construction illustrated may be made by those skilled in the art, within the scope of the appended claims, without departing from the spirit of the invention.*

Having described the invention, what is claimed as new is:

*1.* A static fluid pressure adjusting unit for an idler sprocket supporting guide having a horizontal bore therein and slidable horizontally on a pair of horizontal parallel rails, said unit comprising a cylinderical internally threaded socket having a base plate attachable on said rails, a grease containing cylinder having a reduced rear end threaded into said socket and an open front end, a piston slidably extending out of the front end of the cylinder and having a reduced front end adapted to slidably fit in said bore and forming a circumferential shoulder on said piston adapted to engage said guide around said bore, a bellows-like sleeve protecting the outer end of the piston surrounding said piston from said shoulder to the outer end of the cylinder and attached to said piston and cylinder, and a grease fitting in the rear end of said cylinder communicating therewith for introducing and retaining grease under pressure in the cylinder to operate said piston.

*2. A static fluid pressure adjusting device for an idler sprocket supporting guide slidable longitudinally on one of a pair of parallel support members, said device including: a connecting member having means for attaching it on said support members; a grease containing cylinder having means at its rear end engaged with said connecting member, said cylinder having a bore open unrestrictedly at its front end; a cylindrical plunger having a diameter slidably fitting said cylinder bore and slidably mounted in said bore; means on the plunger providing a fluid seal between said cylinder and said plunger; said plunger having at its outer front end connecting means providing a shoulder on said plunger engageable with said idler sprocket supporting guide whereby movement of*

*said plunger moves said guide; and a grease fitting having communication with the rear end of said cylinder bore for introducing and retaining grease under pressure in the bore of said cylinder to move said plunger outwardly of said cylinder bore to an adjusted position and to confine the grease in said cylinder bore to hold said plunger against retraction inwardly of said cylinder.*

*3. A static fluid pressure adjusting device for an idler sprocket supporting guide slidable longitudinally on one of a pair of parallel rails, said device including: a connecting member having means for attaching it on one of said rails; a grease containing cylinder having means at its rear end engaged with said connecting member, said cylinder having a bore open unrestrictedly at its front end; a cylindrical plunger having a diameter slidably fitting said cylinder bore and having its inner end portion slidably inserted into said bore and slidable therein; said plunger having at its outer front end connecting means providing a shoulder on said plunger engageable with said idler sprocket supporting guide, whereby movement of said plunger moves said guide; a sleeve means between the outer open end of said cylinder and the outer*

*exposed end of said plunger; and a grease fitting having communication with the rear end of said cylinder bore for introducting and retaining grease under pressure in the cylinder bore to operate said plunger.*

References Cited in the file of this patent or the original patent

UNITED STATES PATENTS

| | | |
|---|---|---|
| 1,368,652 | Pennington et al. | Feb. 15, 1921 |
| 1,861,866 | Knox et al. | June 7, 1932 |
| 1,981,867 | Knox et al. | Nov. 27, 1934 |
| 2,011,565 | Barnes | Aug. 20, 1935 |
| 2,211,403 | Boldt et al. | Aug. 13, 1940 |
| 2,280,341 | Mott | Apr. 21, 1942 |
| 2,284,821 | Heaslet | June 2, 1942 |
| 2,335,833 | Wood | Nov. 30, 1943 |
| 2,390,445 | Mercier | Dec. 4, 1945 |
| 2,426,613 | Jackson | Sept. 2, 1947 |
| 2,452,671 | Merrill | Nov. 2, 1948 |
| 2,561,901 | Bachman et al. | July 24, 1951 |
| 2,683,064 | Land | July 6, 1954 |